Jan. 8, 1946.　　R. W. SPAFFORD ET AL　　2,392,417
ELECTRIC TRAVELING CRANE SYSTEM
Filed Sept. 11, 1943　　5 Sheets-Sheet 1
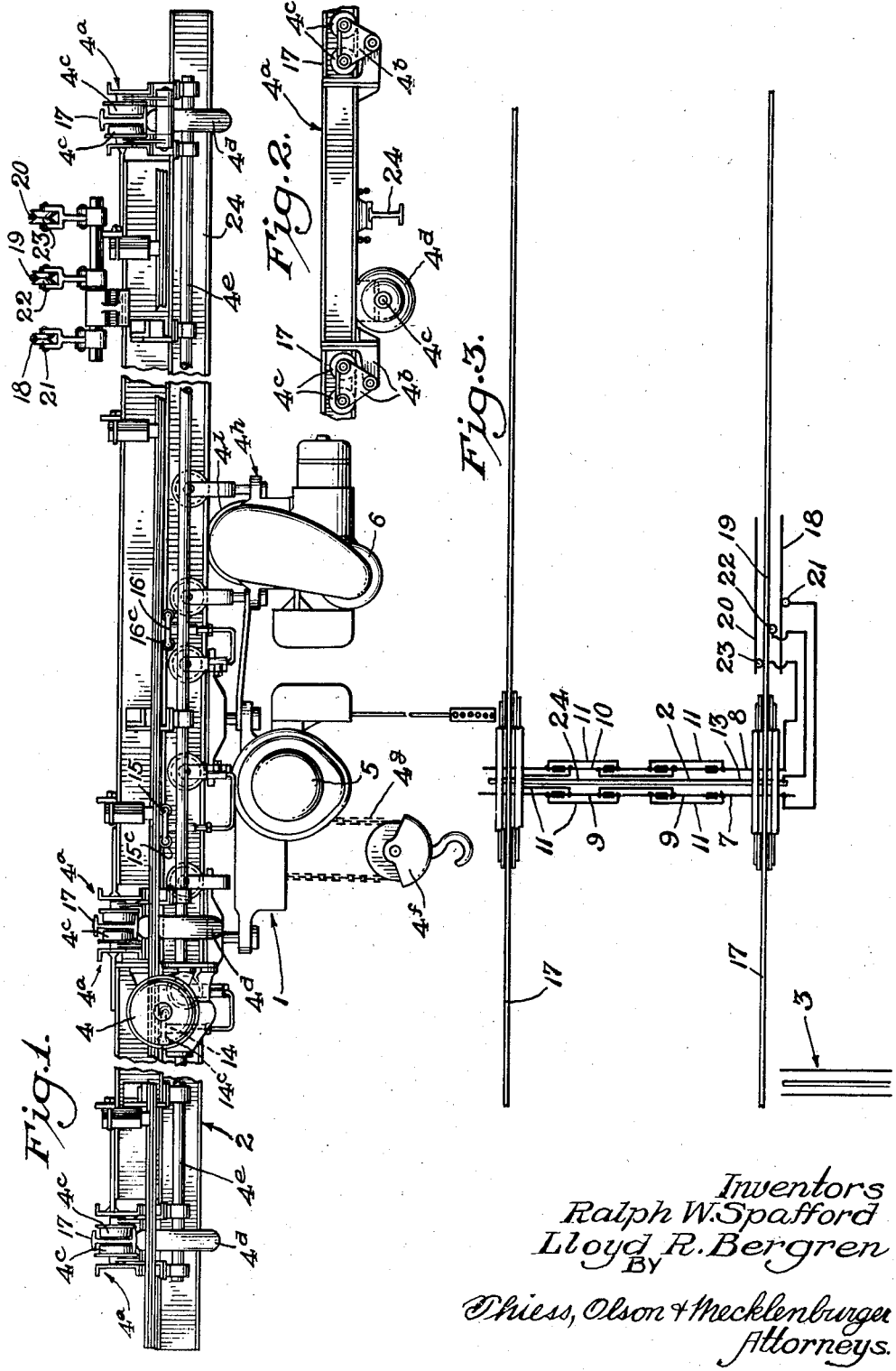
Inventors
Ralph W. Spafford
Lloyd R. Bergren
BY
Thiess, Olson & Mecklenburger
Attorneys.

Jan. 8, 1946.  R. W. SPAFFORD ET AL  2,392,417
ELECTRIC TRAVELING CRANE SYSTEM
Filed Sept. 11, 1943  5 Sheets-Sheet 2

Inventors.
Ralph W. Spafford
Lloyd R. Bergren
BY
Thiess, Olson + Mecklenburger
Attorneys.

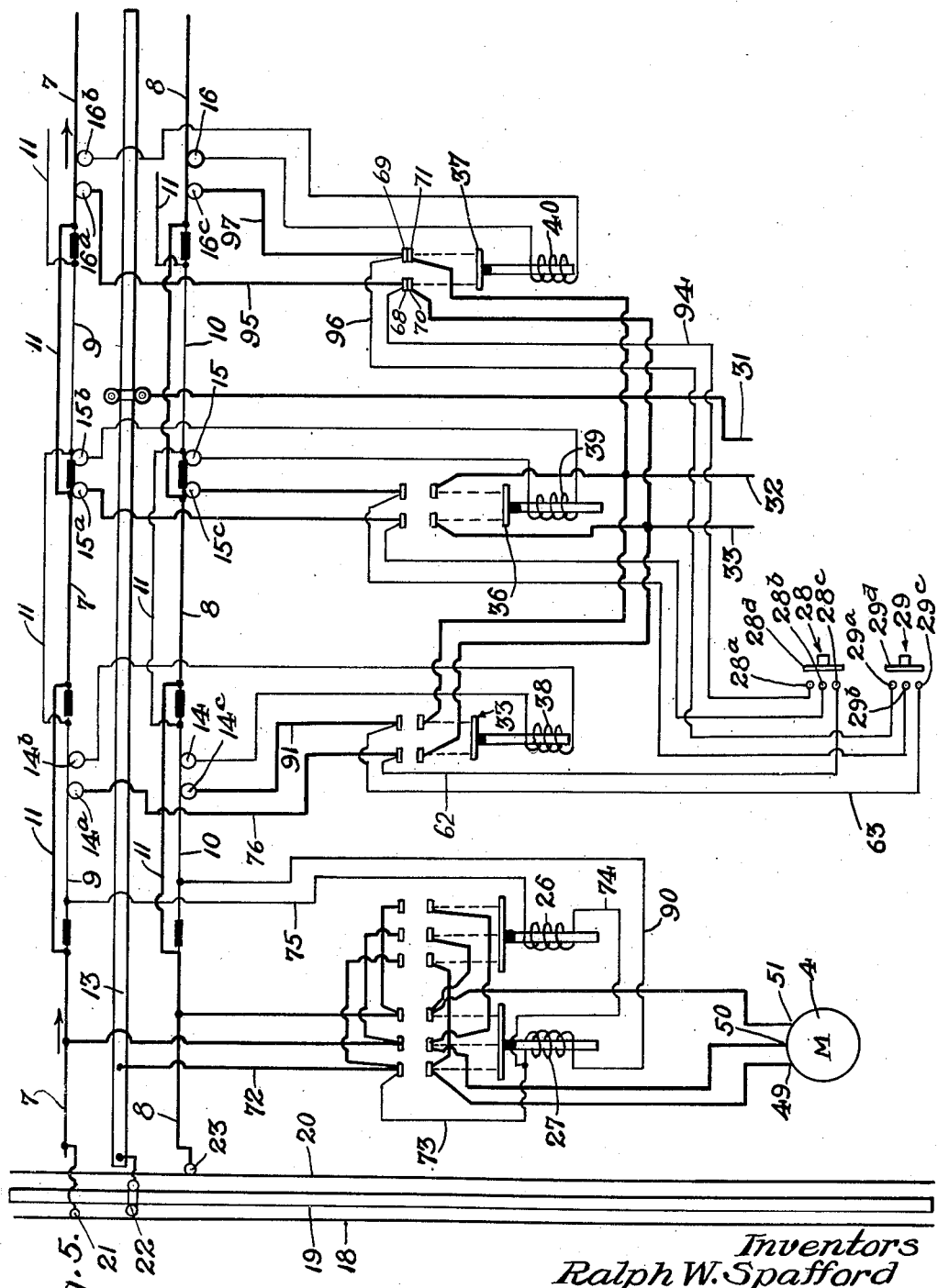

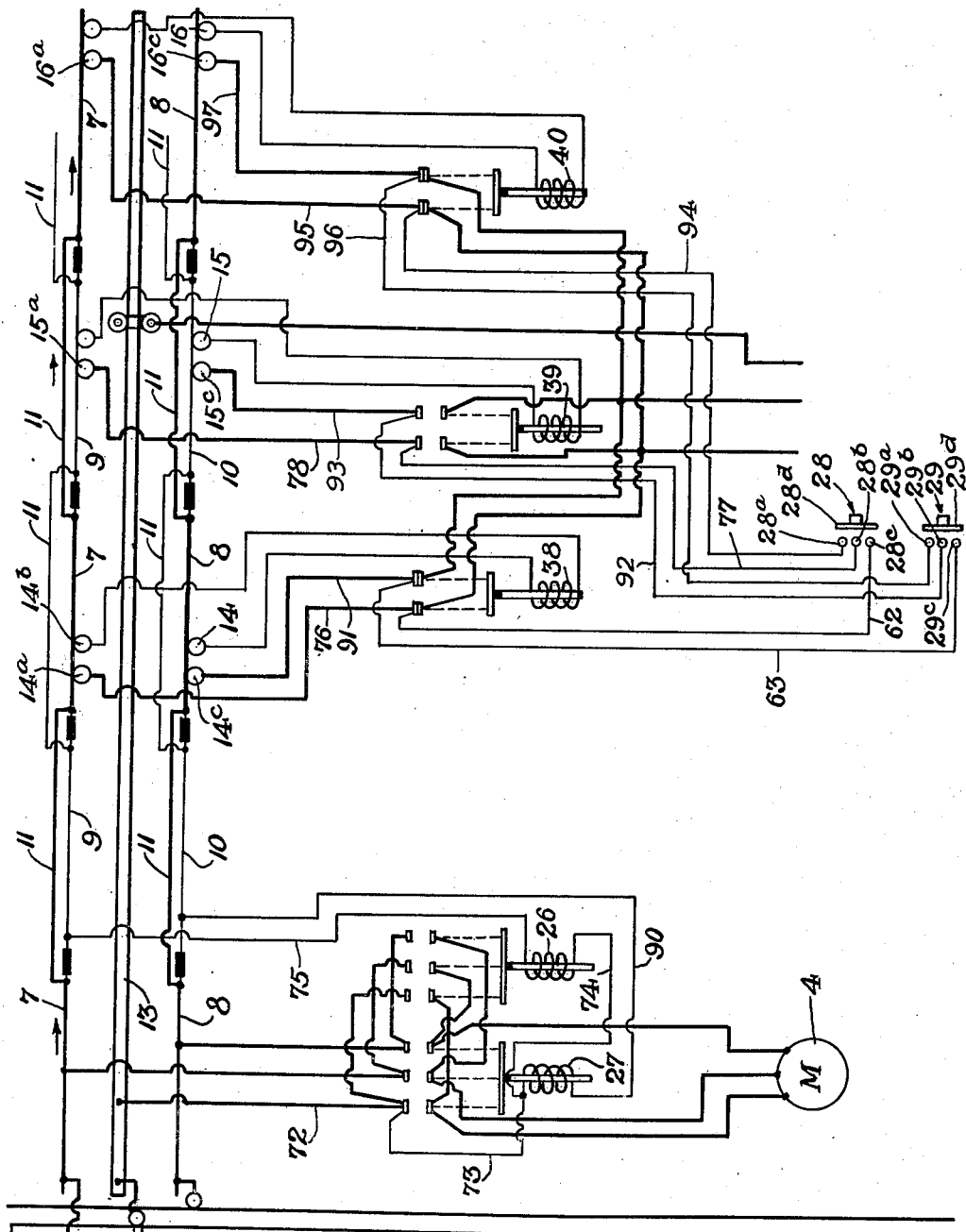

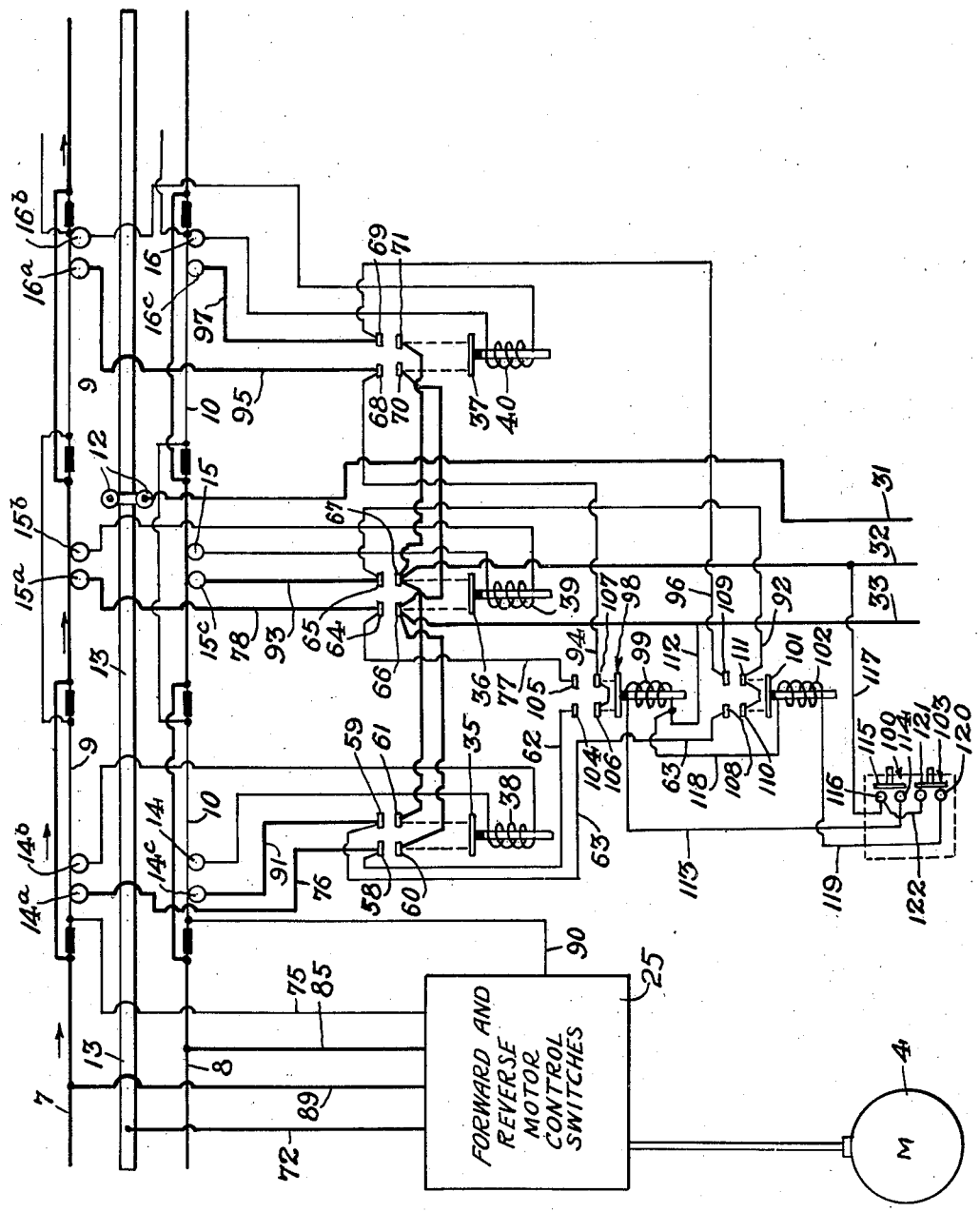

Patented Jan. 8, 1946

2,392,417

UNITED STATES PATENT OFFICE 2,392,417

ELECTRIC TRAVELING CRANE SYSTEM

Ralph W. Spafford and Lloyd R. Bergren, Fairfield, Iowa, assignors to The Louden Machinery Company, Fairfield, Iowa, a corporation of Iowa Application September 11, 1943, Serial No. 501,958

10 Claims. (Cl. 104—48)

Our invention relates to an electric traveling crane system.

One of the objects of our invention is to provide in an electric traveling crane system comprising a bridge carrying a bridge motor and traveling along a runway and provided with a power circuit, a collector engaging control circuit for the bridge motor running along said bridge, and a trolley traveling along the bridge and carrying a motor, apparatus whereby the operator traveling along with the trolley (either on foot or in a cage carried by the trolley) can control the bridge motor to control the bridge travel and can cause the trolley to leave the bridge track and travel off onto a spur track where the trolley-carried motor alone is used, in which the bridge-carried control circuit for the bridge motor is in alignment with the bridge-carried power circuit for the trolley-carried motor or motors, so that the same collectors may cooperate both with the power circuit and the control circuit, thus avoiding the necessity for non-current-carrying guide rails along the spur track.

Further objects and advantages of the invention will be apparent from the specification and claims.

In the drawings, in which two embodiments of our invention are shown,

Figure 1 is a side elevational view of the bridge and trolley;

Fig. 2 is an end elevation of the bridge truck;

Fig. 3 is a plan view showing portions of the bridge and bridge runways;

Fig. 5 is a view similar to Fig. 4 showing the trolley in a different position;

Fig. 6 is a diagrammatic view similar to Figs. 4 and 5, showing the trolley in a third position; and Fig. 7 is a view showing a modified form.

Figure 4:
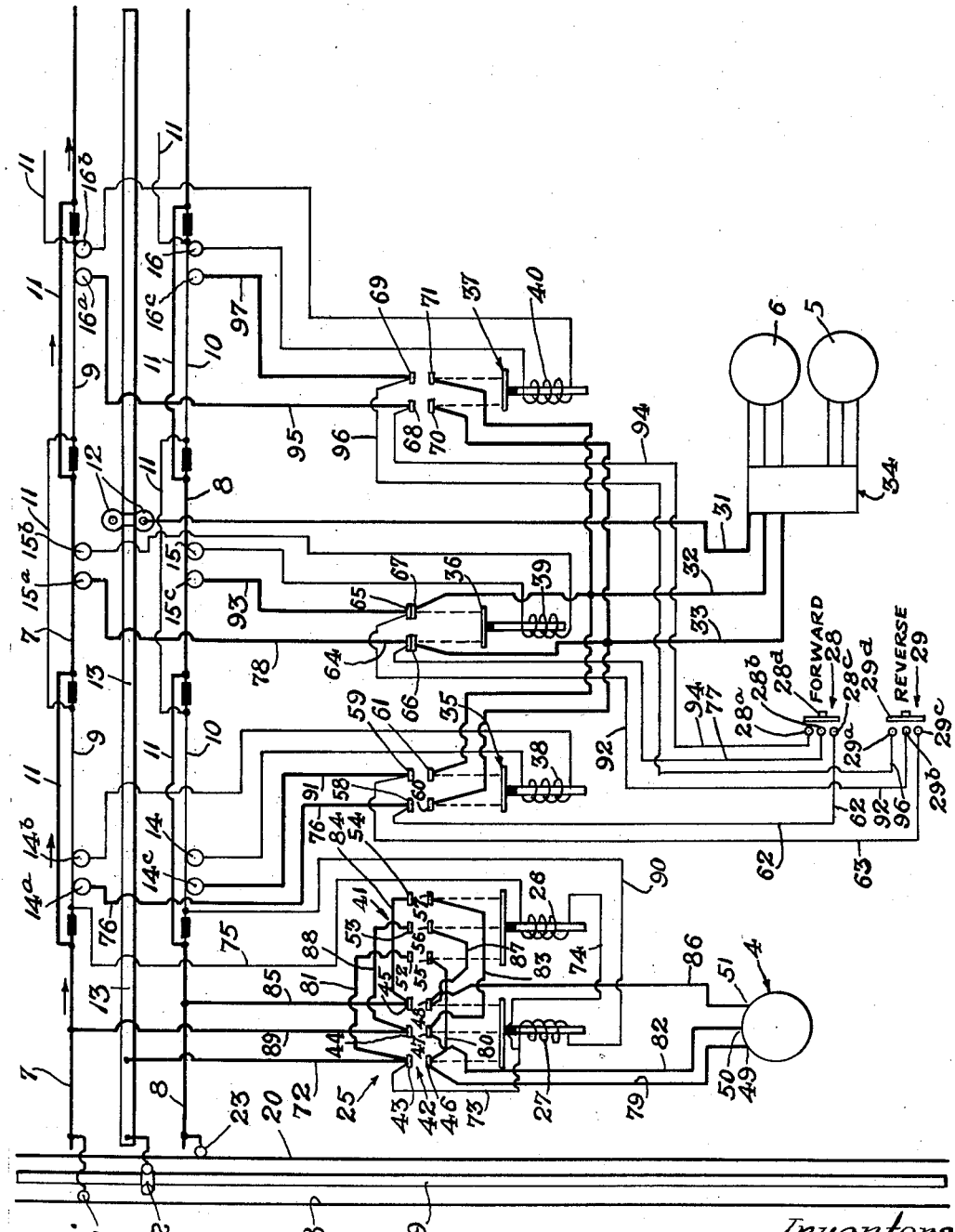
Fig. 4 is a diagrammatic view showing the circuits with the trolley in one position.

As indicated in the statement of the objects of the invention, it may be used in connection with a traveling bridge type crane in which it is required that the trolley 1 which travels along the bridge 2 may be rolled off from the bridge onto a spur track 3 (Fig. 3). So long as the trolley is on the bridge, the bridge motor 4 (Figs. 1, 4, 5, and 6) itself will have to be under control. When the trolley is rolled off the bridge onto the spur track 3, there is no bridge motor which has to be controlled. It is desirable that this bridge motor 4 shall be controllable by an operator traveling along with the trolley either on foot on the floor underneath the trolley or in a cage carried by the trolley.

The bridge is provided with trucks 4a suspended by hangers 4b from the truck wheels 4c traveling along the runways 17 and is propelled along these runways by means of traction wheels 4d engaging the under side of the runways 17 and driven from the bridge motor 4 by means of shafting 4e extending longitudinally of the bridge. The hoist block 4f is suspended from the trolley 1 by means of a chain 4g, one end of which is fixed to the trolley and the other end of which is connected with the hoist motor 5. The trolley may be propelled along the bridge 2, either manually by an operator walking on the floor or by means of a "motoveyor" tractor 4h having a traction wheel 4i engaging the under side of the trackway 24 and driven by the trolley motor 6.

In addition to the bridge motor, the trolley will, in general, carry an operator-controlled motor 5 for operating the hoist and sometimes an additional operator-controlled motor 6 for causing the trolley to travel back and forth along the bridge. With this construction, so long as the trolley is traveling on the bridge, it will be necessary to have a power circuit both for the bridge motor 4 and for the motors carried by the trolley and to have a control circuit whereby the operator can control the bridge motor. This requires, in addition to the ground return, two control conductors for the bridge motor 4 extending the length of the bridge and two power conductors for the trolley-carried motor extending the length of the bridge. In prior installations, this has required four additional conductors extending the length of the bridge, none of the conductors being in alignment with each other so that no one collector would engage more than one of the conductors.

When the trolley is run off from the bridge track onto a spur track 3, there is no need for the control conductors as the bridge motor is not then in use. However, in order to keep the collectors which were in engagement with the control bus bars on the bridge from flopping around as the trolley runs along the spur track, it has been proposed to provide two additional tracks along the spur trackway, not for the purpose of carrying current but to keep these idle collectors from flopping around.

In our improved system, the power bus bars 7 and 8 on the bridge and the control bus bars 9 and 10 on the bridge are made in staggered sections connected by jumpers 11 so that the collectors carried by the trolley 1, as they travel along the bridge, will alternately engage power sections and control sections of the bus bars. In order to insure that there will always be one set of collectors in engagement with a power section and another set in engagement with a control section, we have provided, in addition to the trolley-carried collectors 12 which engage the ground return rail 13, three sets of collectors 14, 14a, 14b and 14c, 15, 15a, 15b and 15c, and 16, 16a, 16b and 16c, spaced apart from each other a distance slightly greater than the length of a bus bar section.

Referring to the drawings in detail, and first to Figs. 1-6, incl., the construction shown therein comprises an electric traveling crane system, including a bridge runway 17, three power bus bars 18, 19 and 20 extending longitudinally of the runway and forming a three-wire circuit, the bus bar 19 being electrically connected with the runway 17, a bridge 2 mounted to travel on this runway, a three-phase reversible bridge motor 4 mounted on this bridge for causing the bridge to travel in either direction along the runway, collectors 21, 22 and 23 engaging the power bus bars 18, 19 and 20, respectively, a trolley trackway conductor rail 24 mounted on the bridge on which the trolley travels and electrically connected with the collector 22, a pair of power bus bars 7 and 8 extending alongside the trolley trackway rail 13, electrically connected with the collectors 21 and 23, respectively, which engage the power bus bars 18 and 20, respectively, a trolley 1 movable onto and off of the trolley trackway 24, a trolley motor 6, and a hoist motor 5 mounted on a trolley, circuit controlling mechanism 25 for controlling the forward and reverse rotation of the bridge motor 4 comprising an electrically energized switch-actuator 26 which, when energized, causes forward rotation of the bridge motor 4, a second electrically energized switch-actuator 27 which, when energized, causes reverse rotation of the bridge motor, one side of each actuator being electrically connected with the trolley trackway rail 13, four sets of collectors (1) 12, (2) 14, 14a, 14b and 14c, (3) 15, 15a, 15b and 15c, and (4) 16, 16a, 16b and 16c, mounted on said trolley, the bus bars 7 and 8 having longitudinally spaced portions engageable and disengageable by three of said sets of collectors (2), (3) and (4) and jumper portions 11 connecting said longitudinally spaced portions not engageable by said three sets of collectors, a pair of control bus bars 9 and 10 extending alongside said trolley trackway rail 13 and electrically connected with the other sides of the actuators 26 and 27, respectively, the control bus bars having longitudinally spaced portions lying between the spaced portions of the bus bars 7 and 8 engageable and disengageable by the above three sets of collectors and jumper portions 11 connecting said longitudinally spaced portions not engageable by said three sets of collectors, said three sets of collectors being longitudinally spaced with respect to each other so that there will always be one set of collectors in engagement with said second pair of power bus bars 7 and 8 and one set in engagement with the control bus bars 9 and 10.

Bridge motor control

The circuit control apparatus for controlling the energization of the bridge motor control actuators 26 and 27 comprises a forward switch 28 and a reverse switch 29, each of said switches comprising three contacts 28a, 28b and 28c and 29a, 29b and 29c, respectively, and a connector 28d and 29d, respectively, for connecting and disconnecting all three contacts with respect to each other, the three contacts 28a, 28b and 28c of the forward switch being electrically connected with the three collectors 16a, 15a and 14a, respectively, and the three contacts 29a, 29b and 29c of the reverse switch being electrically connected with the three collectors 16c, 15c and 14c, respectively.

The circuit controller for the bridge motor 4 comprises two three-contact switches 41 and 42 actuated by the actuators 26 and 27, respectively. The switch 42 comprises three contacts 43, 44 and 45 connected with the bus bars 13, 7 and 8, respectively, and three movable contacts 46, 47 and 48 controlled by the actuator 27 and movable into and out of engagement with the contacts 43, 44 and 45, respectively, and electrically connected with the three motor terminals 49, 50 and 51. When this switch 42 is closed the bridge motor 4 may be driven in what may be termed a forward direction. The switch 41 comprises three contacts 52, 53 and 54 electrically connected with the contacts 43, 44 and 45 and hence electrically connected with the bus bars 13, 7 and 8, respectively, and three contacts 55, 56 and 57 actuated by the actuators 26 and movable into and out of engagement with the contacts 52, 53 and 54, respectively. The movable contacts 55, 56 and 57 are electrically connected with the movable contacts 46, 48 and 47, respectively, and hence with the three terminals 49, 50 and 51 on the bridge motor 4. When the contacts of the switch 41 are brought into engagement, circuits will be established for the bridge motor 4 which will cause the bridge motor to be rotated in what may be termed a reverse direction.

Power supply for trolley carried motors

The power supply for the motors 5 and 6 comprises a three-wire circuit 31, 32 and 33 for supplying current to the trolley motor 6 and hoist motor 5, one wire 31 being electrically connected with the fourth collector 12, a circuit controller 34 for the motors 5 and 6, three circuit controllers 35, 36 and 37 mounted on the trolley 1 for controlling the circuits between the other two wires 32 and 33 and the bus bars 7 and 8, and three electrically energized actuators 38, 39 and 40, one for each of said circuit controllers 35, 36 and 37.

The purpose of the pairs of collector contacts 14 and 14b, 15 and 15b, and 16 and 16b is to control the actuators 38, 39 and 40, respectively, in such a manner that at least one of them will be energized no matter what position the trolley occupies on the bridge. As long as any one of them is energized, the conductors 32 and 33 leading to the trolley and hoist motors will be electrically connected with the power bus bars 7 and 8, respectively. As previously indicated, the spacing of the collector contacts is such that at least one pair of each of the above pairs of collector contacts will be in engagement with a section of the power bus bars 7 and 8 in all positions of the trolley on the trolley trackway 13. As explained hereinafter, this will cause the conductors 33 and 32 for the controller 34 of the trolley-carried motors 5 and 6 to be connected with the power bus bars 7 and 8. The third conductor 31 is connected with the power bus bar 13. The circuit controller 35 comprises a pair of fixed contacts 58 and 59, electrically connected with the collectors 14a and 14c, respectively, and a pair of movable contacts 60 and 61 controlled by the actuator 38 connected with the conductors 33 and 32, respectively, and engageable and disengageable with respect to the contacts 58 and 59. Conductors 62 and 63 lead from the contacts 58 and 59 to the switch contacts 28c and 29c, respectively, of the bridge motor control switches 28 and 29. The circuit controller 36 comprises a pair of fixed contacts 64 and 65, electrically connected with the current collectors 15a and 15c, respectively, and a pair of movable contacts 66 and 67 controlled by the actuator 39 and connected with the trolley motor conductors 33 and 32, respectively. The contacts 64 and 65 are also electrically connected with the switch contacts 28b and 29b, respectively. The circuit controller 37 comprises two fixed contacts 68 and 69, electrically connected with the current collectors 16a and 16c, respectively, and a pair of movable contacts 70 and 71 controlled by the actuator 40 and electrically connected with the contacts 33 and 32, respectively. The contacts 68 and 69 are also electrically connected with the contacts 28a and 29a of the switches 28 and 29.

*Power lines to trolley-carried motors in different trolley positions*

Figs. 4, 5 and 6 show the circuits with the trolley in three different positions on the bridge. In Fig. 4 the collectors 14, 14a, 14b and 14c are in engagement with sections of the control bus bars 9 and 10. The collectors 16, 16a, 16b and 16c are also in engagement with sections of the control bus bars 9 and 10. These two sets of collectors 14, 14a, 14b and 14c and 16, 16a, 16b and 16c, in effect, provide parallel circuits and either circuit would be effective to produce the desired results. However, both are necessary at times, as will appear hereinafter. The intermediate collector contacts 15, 15a, 15b and 15c are in engagement with the power bus bars 7 and 8. Under these conditions, the actuator 39 will be energized and the actuators 38 and 40 will not be energized. The energization of the actuator 39 causes the contacts 66 and 67 to engage contacts 64 and 65, respectively. This energizes the wires 32 and 33 to make the circuit complete to the trolley-carried motors, the wire 31 being connected to the collector 12 which engages the bus bar 13.

In Fig. 5 the set of collectors 16, 16a, 16b and 16c are in engagement with sections of the power bus bars 7 and 8. The other two sets of collectors 14, 14a, 14b and 14c and 15, 15a, 15b and 15c are in engagement with the control bus bars 9 and 10. Under these conditions, the actuator 40 will be energized and the actuators 38 and 39 will not be energized. The energization of the actuator 40 causes the contacts 70 and 71 to engage the contacts 68 and 69, respectively. This energizes the wires 32 and 33 to make the circuit complete to the trolley-carried motors.

In Fig. 6 the collectors 14, 14a, 14b and 14c and 16, 16a, 16b and 16c are both in engagement with sections of the power bus bars 7 and 8. Under these conditions, both the actuator 38 and the actuator 40 will be energized and the actuator 39 will not be energized. This will complete parallel circuits between the bus bars 7 and 8 and the wires 32 and 33, either of the parallel circuits being sufficient to make the circuit complete to the trolley-carried motors.

*Control lines to bridge motor in different trolley positions*

Referring again to Fig. 4, in this position of the trolley, the intermediate set of collectors 15, 15a, 15b and 15c are in contact with sections of the power bus bars 7 and 8, respectively, and the two sets of collectors 14, 14a, 14b and 14c and 16, 16a, 16b and 16c are both in engagement with sections of the control bus bars 9 and 10. Under these conditions, if the forward switch 28 is closed, the forward speed actuator 26 will be energized by completing a circuit between bus bar 13 and 7, the circuit for this actuator 26 being from the intermediate bus bar 13 through the conductors 72, 73 and 74, actuator 26, conductor 75, control bus bar 9, collector 14a, conductors 76 and 62, contact 28c, connector 28d, contact 28b, conductors 77 and 78 and collector 15a to the power bus bar 7.

The energization of the actuator 26 brings the contacts 55, 56 and 57 into engagement with the contacts 52, 53 and 54, respectively, thus electrically connecting the motor terminals 49, 50 and 51 with the bus bars 13, 8 and 7, respectively. The circuit between terminal 49 and bus bar 13 is through the conductors 79 and 80, contacts 55 and 52, and conductors 81 and 72. The circuit from the terminal 50 to the bus bar 8 is through the conductors 82 and 83, contacts 57 and 54, and conductors 84 and 85. The circuit from the terminal 51 to the bus bar 7 is through the conductors 86 and 87, contacts 56 and 53 and conductors 88 and 89. It may be assumed that this will give forward speed to the motor 4.

For reverse, the switch 29 is closed. This closes the circuit through the actuator 27 between the bus bars 13 and 8. The circuit through the actuator 27 is from the bus bar 13 through the conductors 72 and 73, actuator 27, conductor 90, control bus bar 10, collector 14c, conductors 91 and 63, contacts 29c and 29b, conductors 92 and 93 and collector 15c to the power bus bar 8.

The energization of the actuator 27 will cause the contacts 46, 47 and 48 to engage the contacts 43, 44 and 45, respectively, thus electrically connecting the motor terminals 49, 50 and 51 with the bus bars 13, 7 and 8, respectively. The circuit from the terminal 49 to the bus bar 13 is through the conductors 79 and 72. The circuit from the motor terminal 50 to the bus bar 7 is through the conductors 82 and 89. The circuit from the motor terminal 51 to the bus bar 8 is through the conductors 86 and 85. It may be assumed that these motor connections will give reverse speed to the motor.

In Fig. 5 the collectors 16, 16a, 16b and 16c are electrically connected with the power bus bars 7 and 8. The collectors 14, 14a, 14b and 14c are in engagement with the control bus bars 9 and 10. The collectors 15, 15a, 15b and 15c may be out of engagement both with respect to the power bus bars 7 and 8 and the control bus bars 9 and 10. Under these conditions if the forward switch 28 is closed, the actuator 26 will be energized by a circuit therethrough between the bus bars 13 and 7. This circuit is from the bus bar 13 through the conductors 72, 73 and 74, actuator 26, conductor 75, control bus bar 9, collector 14a, conductors 76 and 62, contact 28c, connector 28d, contact 28a, conductors 94 and 95 and collector 16a to the power bus bar 7. This energization of the actuator 26 will connect the terminals 49, 50 and 51 of the motor with the bus bars 13, 8 and 7, respectively, as described in connection with Fig. 4, giving forward speed to the motor 4.

If the reverse switch 29 is closed, the actuator 27 will be energized by a circuit therethrough between the bus bars 13 and 8. This circuit is from the bus bar 13 through the conductors 72 and 73, actuator 27, conductor 90, control bus bar 10, collector 14c, conductors 91 and 63, contact 29c, connector 29d, contact 29a, conductors 96 and 97 and collector 16c to the power bus bar 8. The energization of the actuator 27 will connect the motor terminals 49, 50 and 51 with the bus bars 13, 7 and 8, respectively, as described in connection with Fig. 4, giving reverse speed to the motor 4.

In the trolley position shown in Fig. 6, the set of collectors 14, 14a, 14b and 14c and the set of collectors 16, 16a, 16b and 16c are both in engagement with the power bus bars 7 and 8. The collectors 15, 15a, 15b and 15c are in engagement with the control bus bars 9 and 10. This arrangement gives in effect two parallel power circuits through the two sets of collectors 14, 14a, 14b and 14c and 16, 16a, 16b and 16c. Under these conditions, if the switch 28 is closed, the actuator 26 will be energized by a circuit therethrough between the bus bars 13 and 8. This circuit is from bus bar 13 through the conductors 72, 73 and 74, actuator 26, conductor 75, control bus bar 9, collector 15a, conductors 78 and 77, contact 28b, connector 28d and through either or both of the contacts 28a and 28c to the power bus bar 7. The circuit from the contact 28a to the bus bar 7 is through the conductors 94 and 95 and the collector 16a. The circuit from the contact 28c to the bus bar 7 is through the conductors 62 and 76 and the collector 14a. This energization of the actuator 26 will connect the motor terminals 49, 50 and 51 with the bus bars 13, 8 and 7, respectively, for forward speed of the bridge motor as described in connection with Fig. 4.

If the reversing switch 29 is closed, the reversing actuator 27 will be energized by a circuit therethrough between the bus bars 13 and 8, this circuit being from the bus bar 13 through the conductors 72 and 73, actuator 27, conductor 90, control bus bar 10, collector 15, conductors 93 and 92, contact 29b, connector 29d, and through either or both of the contacts 29a and 29c by conductors 96 and 97 and collector 16c or by conductors 63 and 91 and collector 14c to the power bus bar 8. This energization of the actuator 27 will connect the motor terminals 49, 50 and 51 with the bus bars 13, 7 and 8, respectively, for reverse speed as described in connection with Fig. 4. False operation of the actuators 26 and 27 is avoided by designing the actuators 38, 39 and 40 so that their impedance is high enough to prevent sufficient current from passing to operate the actuators 26 and 27.

The apparatus shown in Fig. 7 may be identical with, or the equivalent of, the construction shown in Figs. 4, 5 and 6, except that in Fig. 7 a substitution is made for the forward and reverse switches 28 and 29 which, in Figs. 4, 5 and 6, control the forward switch circuits 62, 77 and 94 and the reverse switch circuits 63, 92 and 96. The substitution made in Fig. 7 enables the use of standard two-circuit switches instead of the three-circuit switches 28 and 29 of Fig. 4. The substituted apparatus comprises a power actuated forward switch 98, an electrically energized actuator 99 for this switch, and a manually controlled switch 100 for controlling this actuator. The apparatus substituted for the reverse switch 29 comprises a power actuated switch 101, an electrically energized actuator 102 therefor, and a manually operated reverse switch 103 for energizing the reverse actuator. The forward switch 98 comprises two fixed contacts 104 and 105, connected with the wires 62 and 77, respectively, and two contacts 106 and 107, engageable and disengageable with respect to the contacts 104 and 105 and both electrically connected with the conductor 94. The reverse switch comprises two fixed contacts 108 and 109 electrically connected with the conductors 63 and 96, respectively, and two contacts 110 and 111 engageable and disengageable with respect to the contacts 108 and 109 and both electrically connected with the conductor 92. The circuit for the forward switch actuator 99 is from the conductor 33, through the conductor 112, actuator 99, conductor 113, contact 114, connector 115, contact 116 and conductor 117 to the conductor 32. The circuit for the reverse switch actuator 102 is from the conductor 33, through the conductors 112 and 118, actuator 102, conductor 119, contact 120, connector 121 and conductors 122 and 117 to the conductor 32. In operation, when the forward manual switch 100 is actuated, the actuator 99 will be energized and all three conductors 62, 77 and 94 will be connected together just as occurs when the forward switch 28 is operated in Figs. 4, 5, and 6, so that the forward operation of the motor 4 will be brought about. Similarly, when the manual reverse switch 103 is operated, the reverse actuator 102 will be energized, causing the conductors 63, 92 and 96 to be all electrically connected just as occurs when the reverse switch 29 of Figs. 4, 5 and 6 is operated. This will cause reverse operation of the motor 4 just as occurs in Figs. 4, 5 and 6.

Further modifications will be apparent to those skilled in the art and it is desired, therefore, that the invention be limited only by the scope of the appended claims.

Having thus described our invention, what we claim and desire to secure by Letters Patent is:

1. In an electric traveling crane system, a three-line bus bar power circuit, a bridge mounted to travel alongside said circuit and having collectors mounted thereon for engaging said bus bars, respectively, a three-line bus bar power circuit mounted on said bridge and extending longitudinally thereof and electrically connected with said collectors, a three-phase bridge motor mounted on said bridge, a control circuit for said bridge motor comprising a two-line bus bar extending longitudinally of the bridge and mounted thereon, a trolley mounted to travel longitudinally of said bridge, collectors mounted on said trolley for engaging said bridge mounted bus bars, a three-phase motor carried by said trolley, two of said bridge-mounted power circuit bus bars having longitudinally-spaced portions engageable and disengageable by their cooperating collectors, and jumper portions not engageable by said collectors, said control circuit having longitudinally-spaced portions lying between said spaced portions of the power circuit and in alignment therewith and engageable and disengageable by said cooperating collectors, one or more of said trolley mounted collectors being always in engagement with a control bus bar and one or more of said trolley mounted collectors being always in engagement with a power bus bar as the trolley travels along the bridge, means for controlling said bridge motor comprising means for connecting a collector engaging a control bus bar with a collector engaging a power bus bar in alignment with said control bus bar, a three-line circuit for said trolley carried motor, and means for maintaining said three-line circuit in electrical connection with said bridge mounted three-line bus bar power circuit as the trolley travels along the bridge.

2. In an electric traveling crane system, a three-line bus bar power circuit, a bridge mounted to travel alongside said circuit and having collectors mounted thereon for engaging said bus bars, respectively, a three-line bus bar power circuit mounted on said bridge and extending longitudinally thereof and electrically connected with said collectors, a three-phase bridge motor mounted on said bridge, a control circuit for said bridge motor comprising a two-line bus bar extending longitudinally of the bridge and mounted thereon, a trolley mounted to travel longitudinally of said bridge, collectors mounted on said trolley for engaging said bridge mounted bus bars, a three-phase motor carried by said trolley, two of said bridge-mounted power circuit bus bars having longitudinally-spaced portions engageable and disengageable by their cooperating collectors, and jumper portions not engageable by said collectors, said control circuit having longitudinally-spaced portions lying between said spaced portions of the power circuit and in alignment therewith and engageable and disengageable by said cooperating collectors, said collectors comprising a plurality of sets of collectors spaced apart so that there will always be at least one set having one or more collectors in engagement with one of said two bridge mounted power bus bars and one or more collectors in engagement with the other of said two bridge mounted power bus bars and so that there will always be at least one set having one or more collectors in engagement with one of said control bus bars and one or more collectors in engagement with the other control bus bar as the trolley travels along the bridge, means for controlling said bridge motor comprising means for connecting a collector engaging a control bus bar with a collector engaging a power bus bar in alignment with said control bus bar, a three-line circuit for said trolley carried motor, and means for maintaining said three-line circuit in electrical connection with said bridge mounted three-line bus bar power circuit as the trolley travels along the bridge.

3. In an electric traveling crane system, a three-line bus bar power circuit, a bridge mounted to travel alongside said circuit and having collectors mounted thereon for engaging said bus bars, respectively, a three-line bus bar power circuit mounted on said bridge and extending longitudinally thereof and electrically connected with said collectors, a three-phase bridge motor mounted on said bridge, a control circuit for said bridge motor comprising a two-line bus bar extending longitudinally of the bridge and mounted thereon, a trolley mounted to travel longitudinally of said bridge, collectors mounted on said trolley for engaging said bridge mounted bus bars, a three-phase motor carried by said trolley, two of said bridge-mounted power circuit bus bars having longitudinally-spaced portions engageable and disengageable by their cooperating collectors, and jumper portions not engageable by said collectors, said control circuit having longitudinally-spaced portions lying between said spaced portions of the power circuit and in alignment therewith and engageable and disengageable by said cooperating collectors, said collectors comprising a plurality of sets of collectors spaced apart so that there will always be at least one set having one or more collectors in engagement with one of said two bridge mounted power bus bars and one or more collectors in engagement with the other of said two bridge mounted power bus bars and so that there will always be at least one set having one or more collectors in engagement with one of said control bus bars and one or more collectors in engagement with the other control bus bar as the trolley travels along the bridge, means for controlling said bridge motor comprising means for connecting a collector engaging a control bus bar with a collector engaging a power bus bar in alignment with said control bus bar, a three-line circuit for said trolley carried motor, and means for maintaining said three-line circuit in electrical connection with said bridge mounted three-line bus bar power circuit as the trolley travels along the bridge, said bridge motor control means comprising an electric actuator for causing forward rotation of the bridge motor, electrically connected with one control bus bar, and an electric actuator for causing reverse rotation of the bridge motor, electrically connected with the other control bus bar.

4. In an electric traveling crane system, a three-line bus bar power circuit, a bridge mounted to travel alongside said circuit and having collectors mounted thereon for engaging said bus bars, respectively, a three-line bus bar power circuit mounted on said bridge and extending longitudinally thereof and electrically connected with said collectors, a three-phase bridge motor mounted on said bridge, a control circuit for said bridge motor comprising a two-line bus bar extending longitudinally of the bridge and mounted thereon, a trolley mounted to travel longitudinally of said bridge, collectors mounted on said trolley for engaging said bridge mounted bus bars, a three-phase motor carried by said trolley, two of said bridge-mounted power circuit bus bars having longitudinally-spaced portions engageable and disengageable by their cooperating collectors, and jumper portions not engageable by said collectors, said control circuit having longitudinally-spaced portions lying between said spaced portions of the power circuit and in alignment therewith and engageable and disengageable by said cooperating collectors, said collectors comprising a plurality of sets of collectors spaced apart so that there will always be at least one set having one or more collectors in engagement with one of said two bridge mounted power bus bars and one or more collectors in engagement with the other of said two bridge mounted power bus bars and so that there will always be at least one set having one or more collectors in engagement with one of said control bus bars and one or more collectors in engagement with the other control bus bar as the trolley travels along the bridge, means for controlling said bridge motor comprising means for connecting a collector engaging a control bus bar with a collector engaging a power bus bar in alignment with said control bus bar, a three-line circuit for said trolley carried motor, and means for maintaining said three-line circuit in electrical connection with said bridge mounted three-line bus bar power circuit as the trolley travels along the bridge, comprising a plurality of electric actuators, one for each set of collectors, each actuator having one side connected with a collector engageable with one of said two bridge mounted power bus bars and its other side connected with a collector engageable with the other of said two bridge mounted bus bars.

5. In an electric traveling crane system, a three-line bus bar power circuit, a bridge mounted to travel alongside said circuit and having collectors mounted thereon for engaging said bus bars, respectively, a three-line bus bar power circuit mounted on said bridge and extending longitudinally thereof and electrically connected with said collectors, a three-phase bridge motor mounted on said bridge, a control circuit for said bridge motor comprising a two-line bus bar extending longitudinally of the bridge and mounted thereon, a trolley mounted to travel longitudinally of said bridge, collectors mounted on said trolley for engaging said bridge mounted bus bars, a three-phase motor carried by said trolley, two of said bridge-mounted power circuit bus bars having longitudinally-spaced portions engageable and disengageable by their cooperating collectors, and jumper portions not engageable by said collectors, said control circuit having longitudinally-spaced portions lying between said spaced portions of the power circuit and in alignment therewith and engageable and disengageable by said cooperating collectors, said collectors comprising a plurality of sets of collectors spaced apart so that there will always be at least one set having one or more collectors in engagement with one of said two bridge mounted power bus bars and one or more collectors in engagement with the other of said two bridge mounted power bus bars and so that there will always be at least one set having one or more collectors in engagement with one of said control bus bars and one or more collectors in engagement with the other control bus bar as the trolley travels along the bridge, means for controlling said bridge motor comprising means for connecting a collector engaging a control bus bar with a collector engaging a power bus bar in alignment with said control bus bar, a three-line circuit for said trolley carried motor, and means for maintaining said three-line circuit in electrical connection with said bridge mounted three-line bus bar power circuit as the trolley travels along the bridge, said bridge motor control means comprising an electric actuator for causing forward rotation of the bridge motor, electrically connected with one control bus bar, and an electric actuator for causing reverse rotation of the bridge motor, electrically connected with the other control bus bar, a trolley-carried motor control means comprising a plurality of electric actuators, one for each set of collectors, each actuator having one side connected with a collector engageable with one of said two bridge mounted power bus bars and its other side connected with a collector engageable with the other of said two bridge mounted bus bars.

6. In an electric traveling crane system, a bridge mounted to travel along a track, a bus bar power circuit mounted on said bridge and extending longitudinally thereof, means for supplying energy to said power circuit during travel of said bridge, a bridge motor mounted on said bridge, a control circuit for said bridge motor including two bus bars extending longitudinally of the bridge and mounted thereon, a trolley mounted to travel longitudinally of said bridge, collectors mounted on said trolley for engaging said bridge mounted bus bars, a motor carried by said trolley, two of said power circuit bus bars having longitudinally spaced portions engageable and disengageable by their cooperating collectors, and jumper portions not engageable by said collectors, said control circuit bus bars having longitudinally spaced portions lying between said spaced portions of the power circuit and in alignment therewith and engageable and disengageable by said cooperating collectors, one or more of said trolley mounted collectors being always in engagement with a control bus bar and one or more of said trolley mounted collectors being always in engagement with a power bus bar as the trolley travels along the bridge, means for controlling said bridge mounted motor comprising means for connecting a collector engaging a control bus bar with a collector engaging a power bus bar in alignment with said control bus bar, a motor circuit for said trolley-carried motor, and means for maintaining said motor circuit in electrical connection with said bus bar power circuit as the trolley travels along the bridge.

7. A control system for controlling from a single control station a pair of electric motors, one of which is relatively stationary and the other of which is movable relative to said first motor, said control station being mounted for movement with said second motor, comprising a three-conductor power circuit extending along the path of movement of said second motor, two conductors of said circuit comprising longitudinally aligned spaced portions and connecting jumper portions disposed out of alignment with said spaced power portions, a control circuit including a pair of control conductors having longitudinally spaced portions disposed between and in alignment with said spaced power portions and jumper connections between said spaced control portions, current collectors mounted for movement with said second motor for engaging said power and control conductors including a set of collectors for each of said two power conductors, each of said sets including a plurality of collectors so spaced longitudinally that at least one collector engages one of said power portions and at least one collector engages one of said control portions in all positions of said collector sets along the path of movement of said second motor, control means fixedly mounted with respect to said one motor and connected to said control circuit for selective energization therefrom, said control means being operable to selectively connect said one motor to said power circuit, means in said movable control station for selectively connecting one or the other of said pair of control conductors to a corresponding one of said two power conductors to operate said control means and energize said one motor regardless of the position of said control station along said path, a three-conductor motor circuit for said second motor controllable from said control station, and means for automatically maintaining electrical connections between said motor circuit and said power circuit through said collectors as said second motor moves along said path and said collectors in said sets sequentially engage and disengage said spaced control and power portions.

8. A control system for controlling from a single control station a pair of electric motors, one of which is relatively stationary and the other of which is movable relative to said first motor, said control station being mounted for movement with said second motor, comprising a power circuit extending along the path of movement of said second motor, two conductors of said circuit comprising longitudinally-aligned spaced portions and connecting jumper portions disposed out of alignment with said spaced power portions, a control circuit including a pair of control conductors having longitudinally-spaced portions disposed between and in alignment with said spaced power portions and jumper connections between said spaced control portions, current collectors mounted for movement with said second motor for engaging said power and control conductors including a set of collectors for each of said two power conductors, each of said sets including a plurality of collectors so spaced longitudinally that at least one collector engages one of said power portions and at least one collector engages one of said control portions in all positions of said collector sets along the path of movement of said second motor, control means fixedly mounted with respect to said one motor and connected to said control circuit for selective energization therefrom, said control means being operable to selectively connect said one motor to said power circuit, means in said movable control station for selectively connecting one or the other of said pair of control conductors to a corresponding one of said two power conductors to operate said control means and energize said one motor regardless of the position of said control station along said path, a motor circuit for said second motor controllable from said control station, and means for automatically maintaining electrical connections between said motor circuit and said power circuit through said collectors as said second motor moves along said path and said collectors in said sets sequentially engage and disengage said spaced control and power portions.

9. In a transfer crane bridge system of the type having a bridge movable in a fixed path between a plurality of positions, in at least one of which positions said bridge is alignable with a branch track, and a trolley movable longitudinally of said bridge and movable onto said branch track when said bridge is in said one position, said bridge and said trolley each having a motor mounted thereon, the combination of a three-conductor power system mounted on and extending longitudinally of said bridge, two of said power conductors comprising aligned longitudinally-spaced portions and connecting jumper portions disposed out of alignment with said spaced portions, a control circuit including a pair of control conductors having longitudinally-spaced aligned portions extending between and insulated from said spaced power conductor portions, jumpers connecting said spaced portions of said control conductors, collectors on said trolley for engaging said three-conductor power circuit including a set of collectors for each of said two power conductors adapted, to sequentially engage and disengage said aligned spaced power portions and control portions as said trolley moves along said bridge, the collectors in each set being so spaced longitudinally that in all positions of said trolley along said bridge at least one collector engages one of said power portions and at least one collector engages one of said control portions, control means on said bridge connected to said control circuit for selectively connecting said bridge motor to said power circuit, a control station on said trolley connected between said collectors for selectively connecting one or the other of said control conductors with the corresponding one of said two power conductors to effect operation of said bridge motor control means regardless of the position of said trolley along said bridge, a three-conductor circuit for said trolley motor, and means for maintaining electrical connections between said three-conductor trolley motor circuit and said three-conductor power circuit as said trolley travels along said bridge and said collector sets engage and disengage said spaced conductor portions.

10. In a transfer crane bridge system of the type having a bridge track along which a bridge is movable between a plurality of positions, said bridge including a trolley track extending longitudinally of said bridge and being alignable in at least one of said bridge positions with a branch track, said bridge also having a trolley movable longitudinally thereof on said trolley track and movable from said trolley track onto said branch track when said bridge is in said one position, said bridge and said trolley each having a three-phase reversible motor mounted thereon, the combination of a three-phase three-conductor power system extending along said bridge track and having one conductor thereof connected to ground, collectors carried by said bridge and engaging said conductors, one of said bridge collectors connecting said grounded conductor to said trolley track, a pair of power conductors extending along said trolley track electrically connected to the others of said bridge collectors, said pair of trolley conductors and said trolley track forming a three-conductor three-phase power circuit for said trolley motor, two conductors of said circuit comprising longitudinally-aligned spaced portions and connecting jumper portions disposed out of alignment with said spaced power portions, a control circuit including a pair of control conductors having longitudinally-spaced portions disposed between and in alignment with said spaced power portions and jumper connections between said spaced control portions, current collectors mounted for movement with said trolley motor for engaging said power and control conductors including a set of collectors for each of said two power conductors, each of said sets including a plurality of collectors so spaced longitudinally that at least one collector engages one of said power portions and at least one collector engages one of said control portions in all positions of said collector sets along the path of movement of said trolley motor, control means fixedly mounted with respect to said bridge motor and connected to said control circuit for selective energization therefrom, said control means being operable to selectively connect said bridge motor to said power circuit, means in said movable control station for selectively connecting one or the other of said pair of control conductors to a corresponding one of said two power conductors to operate said control means and energize said bridge motor regardless of the position of said control station along said path, a three-conductor motor circuit for said trolley motor controllable from said control station, and means for automatically maintaining electrical connections between said motor circuit and said power circuit through said collectors as said trolley motor moves along said path and said collectors in said sets sequentially engage and disengage said spaced control and power portions.

RALPH W. SPAFFORD.
LLOYD R. BERGREN.